United States Patent
Gottschalk et al.

(10) Patent No.: US 11,334,033 B2
(45) Date of Patent: May 17, 2022

(54) PREDICTIVE OPERATIONAL PLANNING IN A MICROGRID WITH POWER EXCHANGE BETWEEN THE MICROGRID AND A PRIMARY GRID

(71) Applicant: Siemens Aktiengesellschaft, Munich (DE)

(72) Inventors: Corinna Gottschalk, Munich (DE); Martin Seydenschwanz, Munich (DE)

(73) Assignee: SIEMENS AKTIENGESELLSCHAFT

(*) Notice: Subject to any disclaimer, the term of this patent is extended or adjusted under 35 U.S.C. 154(b) by 237 days.

(21) Appl. No.: 16/698,069

(22) Filed: Nov. 27, 2019

(65) Prior Publication Data

US 2020/0174429 A1    Jun. 4, 2020

(30) Foreign Application Priority Data

Dec. 3, 2018 (EP) .................................. 18209863

(51) Int. Cl.
*G05B 13/02* (2006.01)
*G06F 1/30* (2006.01)
(Continued)

(52) U.S. Cl.
CPC .............. *G05B 13/021* (2013.01); *G06F 1/30* (2013.01); *G06Q 10/04* (2013.01); *H02J 3/06* (2013.01); *H02J 3/003* (2020.01); *H02J 2203/20* (2020.01)

(58) Field of Classification Search
CPC ........ G05B 13/021; G06F 1/30; G06Q 10/04; G06Q 50/06; H02J 3/06; H02J 3/003; H02J 2203/20; Y04S 10/50
See application file for complete search history.

(56) References Cited

U.S. PATENT DOCUMENTS

2002/0095267 A1   7/2002   Knorpp et al.
2004/0234025 A1   11/2004  Schroeder et al.
(Continued)

FOREIGN PATENT DOCUMENTS

DE   10044169 A1   3/2002
DE   10331419 A1   1/2004
(Continued)

OTHER PUBLICATIONS

Basir Khan M Reyasudin et al: "Multi-agent based distributed control architecture for microgrid energy management and optimization", Energy Conversion and Management, Elsevier Science Publishers, Oxford, GB, vol. 112, pp. 288-307, XP029406786, ISSN: 0196-8904, DOI: 10.1016/J.ENCONMAN.2016.01.011; paragraphs [0291]-[0297]; 2016.
(Continued)

*Primary Examiner* — Ziaul Karim
(74) *Attorney, Agent, or Firm* — Schmeiser, Olsen & Watts LLP

(57) ABSTRACT

Techniques for operational planning in a microgrid by means of optimization are provided. This involves a power exchange with a primary grid being taken into consideration. The operational planning in this case is performed by using an optimization, e.g. a (mixed) integer linear optimization. The various examples describe how a power exchange (balancing) can be provided for a primary grid to which the microgrid is connected. In particular, this is achieved by taking into consideration a distinction for the constraint of the optimization. In this manner, a lead time between a request for the power exchange and the actual activating of the power exchange can be taken into consideration.

13 Claims, 4 Drawing Sheets

Figure 1:
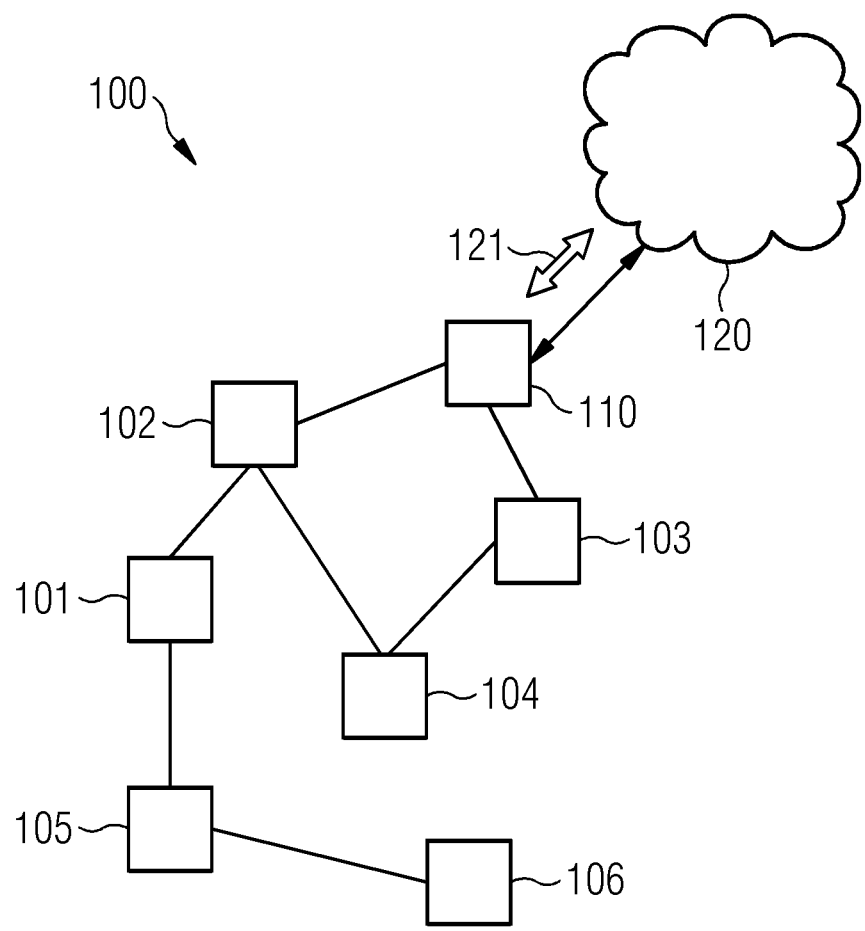

(51) Int. Cl.
*G06Q 10/04* (2012.01)
*H02J 3/06* (2006.01)
*H02J 3/00* (2006.01)

(56) References Cited

U.S. PATENT DOCUMENTS

| | | |
|---|---|---|
| 2006/0288756 A1 | 12/2006 | De Meurechy |
| 2009/0248355 A1 | 10/2009 | Kriegmair |
| 2010/0145653 A1 | 6/2010 | Christoph et al. |
| 2011/0103546 A1 | 5/2011 | Hanke et al. |
| 2013/0158699 A1 | 6/2013 | Deppe et al. |
| 2014/0018969 A1* | 1/2014 | Forbes, Jr. ............ H02J 3/14 700/295 |
| 2015/0039145 A1* | 2/2015 | Yang ............ G05B 13/02 700/291 |
| 2015/0355113 A1 | 12/2015 | Christoph et al. |
| 2016/0074969 A1 | 3/2016 | Kriegmair |
| 2016/0349047 A1 | 12/2016 | Kroos et al. |
| 2017/0092055 A1* | 3/2017 | Brockman ............ G06Q 10/101 |
| 2018/0173171 A1* | 6/2018 | Lin ............ H02J 13/0006 |
| 2018/0358840 A1* | 12/2018 | Gu ............ H02M 7/217 |

FOREIGN PATENT DOCUMENTS

| | | |
|---|---|---|
| DE | 102006022104 A1 | 11/2007 |
| DE | 102007021809 A1 | 10/2008 |
| DE | 102008016026 A1 | 10/2009 |
| DE | 102008020948 A1 | 11/2009 |
| DE | 102008048963 A1 | 4/2010 |
| DE | 102013104490 A1 | 7/2014 |
| DE | 102014202021 A1 | 8/2015 |
| DE | 102014205420 A1 | 9/2015 |
| DE | 102015206510 A1 | 10/2016 |
| DE | 102016200779 A1 | 7/2017 |
| EP | 1559500 A1 | 8/2005 |

OTHER PUBLICATIONS

Moshi Godfrey Gladson et al: "Optimal operational planning for PV-Wind-Diesel-battery microgrid", 2015 IEEE Eindhoven Powertech, IEEE, pp. 1-6, XP033215532, DOI: 10.1109/PTC.2015.7232461; [gefunden am Aug. 31, 2015] pp. 1-4; 2015.

Moreno Rodrigo et al: "A MILP model for optimising multi-service portfolios of dis-tributed energy storage", Applied Energy, vol. 137, p. 554-566; 2015.

\* cited by examiner

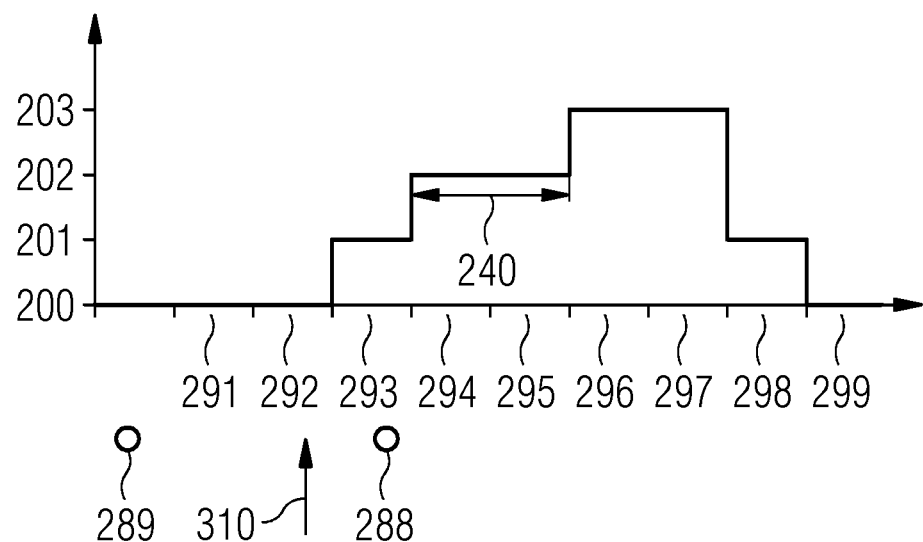
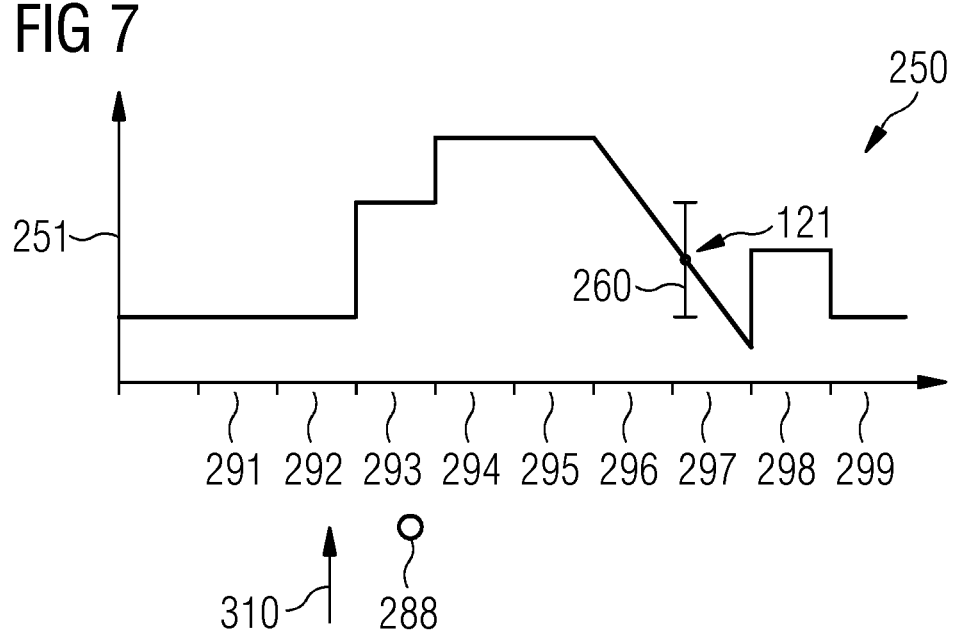

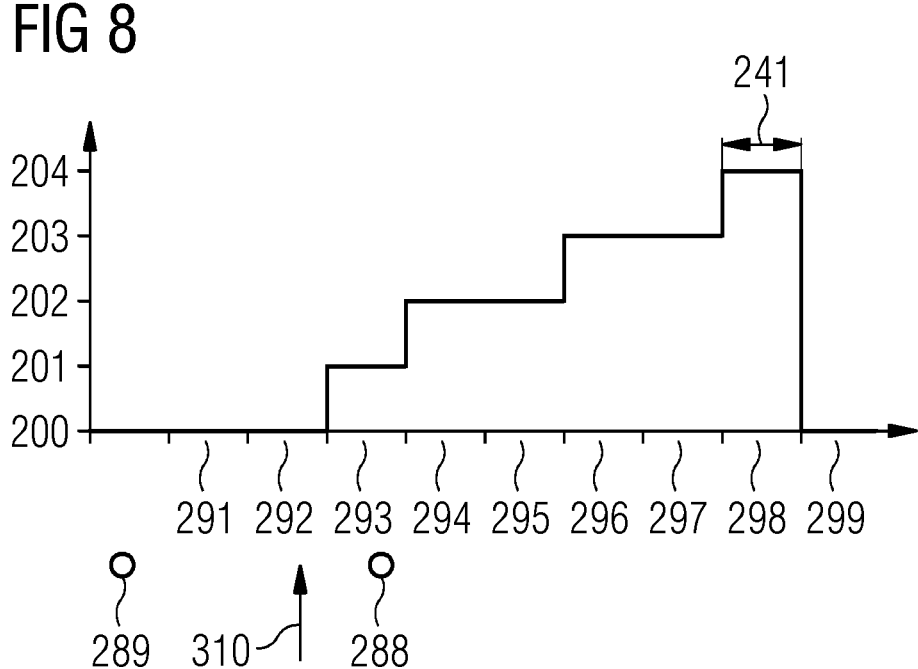

PREDICTIVE OPERATIONAL PLANNING IN A MICROGRID WITH POWER EXCHANGE BETWEEN THE MICROGRID AND A PRIMARY GRID

CROSS-REFERENCE TO RELATED APPLICATIONS

This application claims priority to EP Application No. 18209863.2, having a filing date of Dec. 3, 2018, the entire contents of which are hereby incorporated by reference.

FIELD OF TECHNOLOGY

The following relates in general to Predictive operational planning in a microgrid, wherein the microgrid has a connection to a primary grid. The following also relates to Predictive operational planning, so that the latter provides for a power exchange between the microgrid and a primary grid.

BACKGROUND

Microgrids describe a localized group of power sources and power consumers. Microgrids can comprise conventional power sources and regenerative power sources. The microgrid typically has a limited extent in comparison with primary grids. Typical consumers in a microgrid are for example: residential buildings; automobile batteries; industrial installations; machines; etc. Typical power sources are for example: photovoltaic installations; diesel generators; wind power installations; etc. A microgrid can be used for example in an apartment block, a group home, a military base, a research station or the like. Microgrids can be used for example for independent energy supply for industrial installations or islands.

A microgrid can be connected to a primary grid via a connection. The provision of a connection from the microgrid to the primary grid can allow particularly flexible operation of the microgrid. Additionally, protection against failure can be allowed by resorting to the supply of power by the primary grid. Operation of the primary grid can be stabilized and backed up.

Further, it is known that partaking in control power markets allows the operating costs for microgrids to be lowered by the recompense earned. These control power markets serve to stabilize the primary grid. What are known as power exchange services (balancing service or ancillary services or frequency-response service or reserve service) can be used to perform a power exchange between the microgrid and the primary grid. This can involve for example the operator of the microgrid committing to the operator of the primary grid to make a certain power available and/or to draw a certain power in previously stipulated periods. This allows peaks in consumption or in generation in the primary grid to be absorbed. Operation of the primary grid can be backed up.

SUMMARY

An aspect relates to integrate techniques for power exchange between the microgrid and the primary grid into Predictive operational planning of the microgrid.

A method for Predictive operational planning in a microgrid is described. In this case, the microgrid comprises a connection to a primary grid. The method comprises performing a discrete-time optimization of a target function for a planning interval. The planning interval comprises multiple time intervals in this case. The optimization is also performed by taking into consideration a constraint. The target function and/or the constraint is determined on the basis of multiple states. The time intervals are classified according to the multiple states in this case. The states are selected from the following group: (i) standby for power exchange; (ii) power exchange requested; and (iii) active power exchange. Additionally, the method comprises performing the operational planning on the basis of a result of the optimization. In this case, the operational planning provides for a power exchange between the microgrid and the primary grid via the connection.

The group from which the states are selected can furthermore comprise: (iv) regeneration and (v) switched off.

A device is configured for Predictive operational planning in a microgrid with a connection to a primary grid. The device is configured to carry out the following steps: performing a discrete-time optimization of a target function for a planning interval comprising multiple time intervals and by taking into consideration a constraint, wherein the target function and/or the constraint is determined on the basis of multiple states according to which the time intervals are classified, wherein the states are selected from the following group: (i) standby for power exchange, (ii) power exchange requested and (iii) active power exchange; and performing the operational planning on the basis of a result of the optimization, wherein the operational planning provides for a power exchange between the microgrid and the primary grid via the connection.

A computer program or a computer program product or a computer-readable storage medium comprises a computer readable hardware storage device having computer readable program code stored therein, said program code executable by a processor of a computer system to implement a method. The program code can be loaded and executed by the processor. If the program code is executed by the processor, this causes the processor to carry out a method for Predictive operational planning in a microgrid with a connection to a primary grid, for example. In this case, the method comprises performing a discrete-time optimization of a target function for a planning interval. The planning interval comprises multiple time intervals. The discrete-time optimization is performed in this case by taking into consideration a constraint. The target function and/or the constraint are determined on the basis of multiple states. In this case, the time intervals are classified according to multiple states. The states are in this case selected from the following group: (i) standby for power exchange, (ii) power exchange requested, and (iii) active power exchange. Additionally, the method comprises performing the operational planning on the basis of the result of the optimization. The operational planning in this case provides for a power exchange between the microgrid and the primary grid via the connection.

The features set out above and features that are described below can be used not only in the applicable explicitly presented combinations but also in further combinations or in isolation without departing from the scope of protection of embodiments of the present invention.

BRIEF DESCRIPTION

Figure 2:
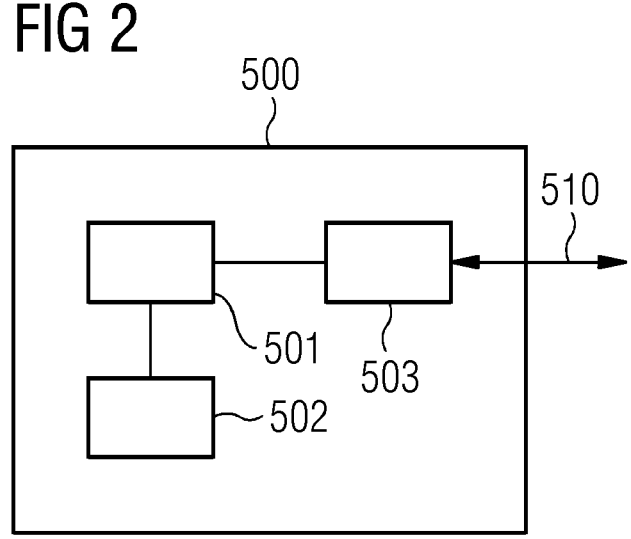
Figure 3:
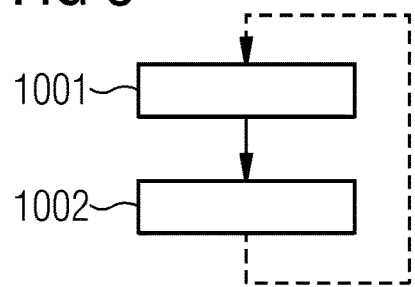
Figure 4:
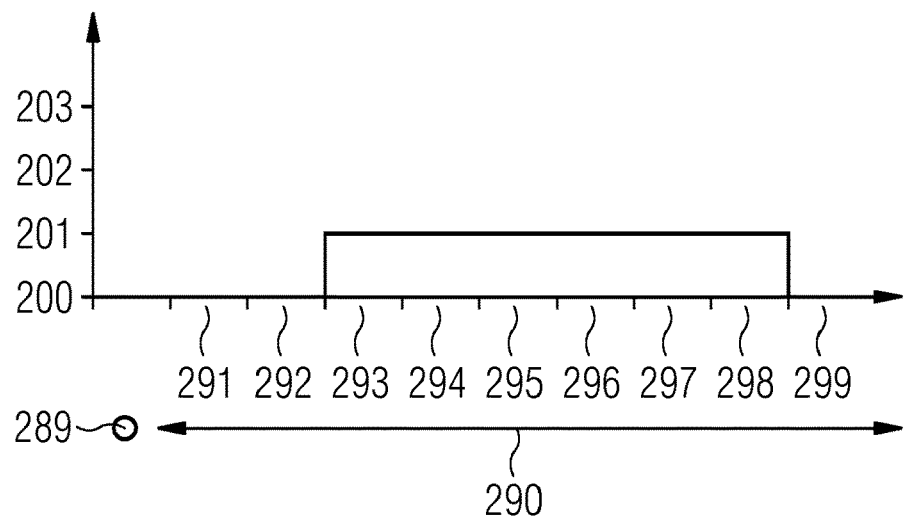
Figure 5:
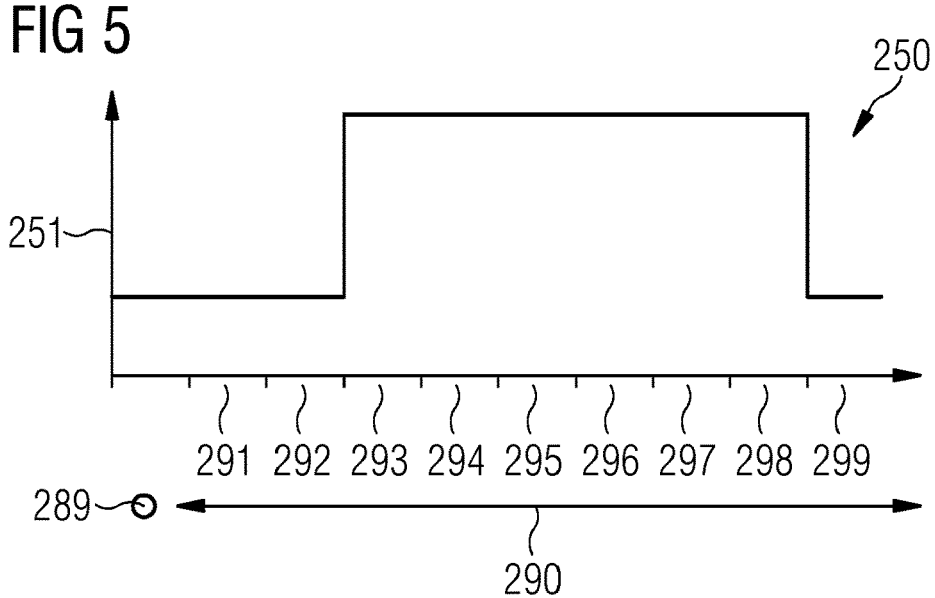

Some of the embodiments will be described in detail, with reference to the following figures, wherein like designations denote like members, wherein:

FIG. 1 schematically illustrates a microgrid and a primary grid that, according to various examples, are connected via a connection;

FIG. 2 schematically illustrates a device having a processor, wherein the device, according to various examples, is configured for operational planning for the microgrid on the basis of a result of an optimization;

FIG. 3 shows a flowchart for an exemplary method;

FIG. 4 schematically illustrates different states of time intervals, wherein, depending on the state, a target function and/or a constraint of the optimization is adapted, according to various examples;

FIG. 5 schematically illustrates a constraint specifying a power reserve, according to various examples;

FIG. 6 schematically illustrates different states of time intervals, wherein, depending on the state, a target function and/or a constraint of the optimization is adapted, according to various examples;

FIG. 7 schematically illustrates a constraint specifying a power reserve, according to various examples; and FIG. 8 schematically illustrates different states of time intervals, wherein, depending on the state, a target function and/or a constraint of the optimization is adapted, according to various examples.

DETAILED DESCRIPTION

The properties, features and advantages of embodiments of this invention that are described above and the manner in which they are achieved become clearer and more distinctly comprehensible in connection with the description of the exemplary embodiments that follows, which are explained in more detail in connection with the drawings.

Embodiments of the present invention are explained in more detail below on the basis of exemplary embodiments with reference to the drawings. In the figures, identical reference signs denote identical or similar elements. The figures are schematic representations of various embodiments of the invention. Elements depicted in the figures are not necessarily depicted to scale. Rather, the various elements depicted in the figures are reproduced such that their function and general purpose becomes comprehensible to a person skilled in the art. Connections and couplings that the figures depict between functional units and elements can also be implemented as an indirect connection or coupling. A connection or coupling can be implemented in wired or wireless fashion. Functional units can be implemented as hardware, software or as a combination of hardware and software.

The description below is of techniques in connection with Predictive operational planning in a microgrid. This means that one or more nodes of a microgrid can be controlled in accordance with an applicable operational plan. For example, it would be possible for consumption, delivered power, operating frequency, etc., to be controlled as appropriate. The operational plan could alternatively or additionally also determine an architecture of the microgrid, i.e. e.g. an interconnection of nodes, etc. The operational plan can stipulate one or more such parameters in time-resolved fashion for a planning interval.

The microgrid can have a multiplicity of power consumers and power sources. By way of example, the microgrid could have one or more of the following nodes: photovoltaic installation; battery energy store; diesel generator; wind power installation; electrical device such as machines, heaters, etc. The microgrid can in particular have a connection to a primary grid. The operator of the microgrid can be different than the operator of the primary grid. Different planning entities can be used for operating the microgrid and operating the primary grid. Different operational plans can be used.

In various techniques described herein, it may be possible to perform operational planning for the microgrid on the basis of a result of an optimization. In this case, the operational planning can provide for a power exchange between the microgrid and the primary grid.

For example, performance of the operational planning can comprise: sending and/or receiving control signals to and/or from one or more nodes of the microgrid, wherein the control signals characterize the electrical operation of the nodes. For example, the control signals could be used to control a power draw and/or a power delivery via the different nodes.

In various examples, it would be possible for the optimization to be performed in discrete-time fashion, i.e. by taking into consideration a number of discrete time intervals. Typical time intervals that can be taken into consideration for the optimization can have a length in the range from a few tens of seconds to minutes, for example.

It is for example possible for the optimization to be performed prospectively for the planning interval, beginning at the actual time. In particular, it would be possible for the optimization to be performed in rolling fashion. This means that a sliding window approach can be used, which involves the optimization being performed repeatedly in multiple iterations in succession, wherein the respective planning interval starts at the respective actual time and hence is advanced in time from iteration to iteration. The planning interval can comprise for example a number of time intervals, for example 1000 or 10,000 or more time intervals. Typically, the planning interval can have a length in the region of hours or days.

In some examples, it would be possible for an integer linear optimization (mixed integer linear programming optimization, MILP optimization) to be performed, for example. In other examples, however, it would also be possible for an integer quadratic optimization to be performed. The effect that can be achieved by using an integer optimization is that the optimization can be performed particularly efficiently in terms of resources and quickly. Additionally, for example binary state variables can be defined that assume the value 1 or the value 0, for example, depending on whether a specific criterion is satisfied or is not satisfied.

Using a linear optimization in turn allows the use of an implementation of the optimization that is particularly efficient in terms of computing and not very intensive in terms of resources. Additionally, it may be possible to guarantee finding a global maximum or a global minimum of a target function of the optimization—by taking into consideration one or more constraints. Applicable approaches to a solution for integer linear optimizations are known to a person skilled in the art, in principle, and can be used here. An applicable example is described for example in: "*Optimal Operational Planning for PV-Wind-Diesel-Battery Microgrid*, G. G. Moshi, C. Bovo, and A. Berizzi, IEEE Eindhoven PowerTech, 2015".

In the various examples, a power exchange between the microgrid and the primary grid via an applicable connection is taken into consideration with reference to performance of the optimization. The power exchange can mean that electric power is transferred from the primary grid to the microgrid (power draw) in one or more applicable time intervals and/or electrical power is transferred from the microgrid to the primary grid (power delivery) in one or more further time intervals. Taking into consideration a power exchange allows the operation of the primary grid and the operation of the microgrid to be stabilized. In particular, consumption peaks or production peaks in the microgrid and/or in the primary grid can be absorbed. This allows individual nodes in the grids to be prevented from malfunctioning, in particular.

Various examples are based on the insight that, with reference to the power exchange, there is frequently an early warning time (response time). The early warning time in this case denotes a period between the receiving of a control signal indicative of a requested power exchange and the actual activation of the power exchange with power transmission. Further examples are based on the insight that following performance of the energy exchange between the microgrid and the primary grid—that is to say after the power exchange has ended—there can be a regeneration time (recovery time), which can be used to put the system back into a desired state (stabilized state). Before the regeneration time concludes, fresh performance of an active power exchange can be avoided.

With reference to the various techniques described herein, it may be possible to perform the operational planning Predictively such that the power exchange is taken into consideration—e.g. additionally besides other constraints of the operation of the various nodes of the microgrid. In particular, the techniques described herein may be able to be used to integrate the power exchange into conventional algorithms for Predictive operational planning using an optimization. The techniques described herein allow different types of power exchange to be configured using a standard set of parameters with reference to the optimization. In particular, the techniques described herein are not restricted to individual energy storage units, such as for example only to batteries, cf. "*A MILP model for optimising multi-service portfolios of distributed energy storage*, R. Moreno, R. Moreira, G. Strbac, Applied Energy 137, pages 554-566, 2015"

In accordance with various examples, this is achieved by classifying the time intervals of the discrete-time optimization into one of multiple system modes or states in each case. In particular, the states can be selected from the following group: (i) standby for power exchange and (ii) power exchange requested and (iii) active power exchange. In various examples, it is thus possible for the target function and/or the constraint of the optimization to be adapted on the basis of the respective classified states of the applicable time intervals in each case. This means for example that a first time interval with a first state (for example (i) standby for power exchange) has a different constraint and/or target function than a second interval (for example with state (ii) power exchange requested).

For example, in this context, it might become possible for the constraint in time intervals with state (i) standby for power exchange to define the buildup of a power reserve for one or more nodes of the microgrid. This allows a reserve concept to be implemented that is suitable for the power exchange. For example, a positive reserve could be provided for by building up the power reserve in one or more energy sources as nodes of the microgrid, i.e. it would be possible for batteries to be charged or for diesel power generators to be started up with a certain latency, for example. Alternatively or additionally, however, it would also be possible to provide for a negative power reserve, namely with reference to one or more energy consumers of the microgrid. That is to say it would be possible for the energy consumption of specific loads to be lowered, for example, so that the energy consumption could be increased to a maximum for a short time if necessary with reference to the power exchange.

In this context, it may for example also be possible for a certain underfill or overfill of the requested power exchange to be taken into consideration by means of the constraint. For example, this can be implemented by virtue of the constraint of the optimization taking into consideration a prescribed value for the power exchange, and additionally also taking into consideration a positive tolerance and/or negative tolerance for the prescribed value, in time intervals with state (iii) active power exchange.

FIG. 1 schematically illustrates a microgrid 100 having a number of nodes 101-106. The nodes 101-106 are connected by lines, wherein the arrangement of the nodes in the microgrid 100 determines an architecture of the microgrid 100. Additionally, the microgrid 100 also has another node 110, which models a connection of the microgrid 100 to a primary grid 120. The connection 110 can be used to implement a power exchange 121 between the microgrid 100 and the primary grid 120, i.e. an electric power flow can be realized.

During the performance of operational planning of the microgrid 100, the individual operation of the different nodes 101-106 can be controlled. Alternatively or additionally, it would also be possible for the architecture of the microgrid 100 to be configured, however.

FIG. 2 schematically illustrates a device 500 that can be used to perform operational planning for the operation of a microgrid—for example the microgrid 100 from FIG. 1. The device 500 comprises a processor 501. For example, the processor could be implemented as an FPGA or ASIC or microprocessor or CPU. The device 500 also comprises a memory 502, for example a nonvolatile memory and/or a volatile memory. For example, the memory 502 could be in the form of a RAM store. Alternatively or additionally, the memory 502 could be in the form of a magnetic hard disk or flash memory. In particular, it may be possible for program code to be stored on the memory 502 and to be loaded and executed by the processor 501. The processor 501 can also use a communication interface 503 to exchange control signals 510 with one or more of the nodes 101-106, 110 of the microgrid 100. This allows the operation of the nodes 101-106, 110 to be controlled. It would for example also be possible for a flexible interconnection of the connections and lines between the different nodes 101-106, 110 of the microgrid 100 to be controlled by means of appropriate control signals 502. If the processor 501 executes the program code loaded from the memory 502, this can cause the processor 501 to carry out specific techniques, as are described in detail below. These techniques can comprise for example: performing operational planning for a microgrid; performing an optimization, in particular an integer linear optimization, by taking into consideration constraints; setting the target function and/or the constraint of the optimization by taking into consideration one or more states according to which time intervals of the discrete-time optimization can be classified; etc.

For example, one possible method that can be carried out by the processor 501 by loading the program code from the memory 502 is described with reference to the flowchart in FIG. 3.

FIG. 3 schematically illustrates a method in accordance with various examples. FIG. 3 is a flowchart. For example, the method in FIG. 3 could be carried out by a device containing a processor and a memory having applicable program code (cf. device 500 from FIG. 2). The method in accordance with FIG. 3 is used for the operational planning of a microgrid, for example the microgrid 100 from FIG. 1.

First of all, block 1001 involves a discrete-time optimization of a target function for a planning interval being performed. In particular, the planning interval can extend from the actual time into the future. This means that Predictive operational planning is rendered possible in block 1002, because specific control parameters of the different nodes of the microgrid can be actuated on the basis of a result of the optimization from block 1001 and in this way it is possible to Predictively forecast how the operation of the microgrid changes over time.

Block 1002 involves the operational planning being performed. This involves the result of the optimization from block 1001 being taken into consideration. The operational planning can comprise e.g. the determining of an operational plan.

In various examples, it may be possible for the optimization and the operational planning in blocks 1001 and 1002 to be performed in rolling fashion, this being indicated by the dashed line in FIG. 3.

When the optimization is performed in block 1001, it may in particular be possible for different states to be taken into consideration for different time intervals in the planning interval. Depending on the state of the respective time interval, it is then possible for the target function and/or the constraint of the optimizations in block 1001 to be adapted. By taking into consideration such different states, it may be possible in a particularly efficient and simple manner for a power exchange between the microgrid 100 and the primary grid 120 to be taken into consideration. Such different states are illustrated in particular with reference to FIG. 4.

FIG. 4 illustrates aspects with reference to the performing of a discrete-time optimization for a planning interval 290 comprising multiple time intervals 291-299. The optimization in this case is carried out at the time 289, specifically in anticipation of the subsequent planning interval 290.

In particular, FIG. 4 illustrates various states 200-203 into which the different time intervals 291-299 have been classified. While a number of, in total, four states 200-203 is depicted in the example of FIG. 4, it would be possible in other examples for a larger or smaller number of states to be used, and in particular it would also be possible to use different states than those depicted in FIG. 4.

In the example of FIG. 4, the different states 200-203 are associated with the power exchange 121 between the microgrid 100 and the primary grid 120. In particular, the target function and/or the constraint of the optimization is adapted on the basis of the state 200-203 into which an applicable time interval 291-299 has been classified. This adaptation is effected e.g. for the preparation, activation and deactivation of the power exchange.

In the example of FIG. 4, there is provision for the following states 200-203—as an actual example:

The state 200 classifies time intervals 291-292, 299 in which a power exchange 121 with the primary grid 120 is excluded. That is to say that in this case the power exchange 121 is stopped, for example. This exclusion can be based on a-priori knowledge. For example, the exclusion might have been established contractually between an operator of the microgrid 101 and an operator of the primary grid 120. This means that it is not necessary to be prepared for an energy exchange to take place in the applicable time intervals 291-292, 299 with the state 200.

By contrast, the state 201 can be referred to as (i) standby for power exchange. The state 201 can denote a situation in which a power exchange 121 with the primary grid 120 is fundamentally possible on the basis of a-priori knowledge, but does not necessarily have to be activated.

The state 202 in turn denotes time intervals (none of the time intervals 291-299 are classified in the state 202 in FIG. 4) in which the activating of the power exchange 121 has actually been requested, for example by an operator node of the primary grid 120. The state 202 can thus be referred to as: (ii) power exchange requested.

Finally, the state 203 denotes time intervals (none of the time intervals 291-299 are classified in the state 203 in the example of FIG. 4) in which the power exchange 121 is activated, i.e. energy is exchanged between the microgrid 100 and the primary grid 120. The state 203 can thus be referred to as: (iii) active power exchange.

In the example of FIG. 4, the activating of the power exchange 121 has not actually been requested (e.g. because the network operator of the primary grid 120 has no need therefor). There are therefore—as at the time 289 at which the optimization is performed—no time intervals 291-299 that would be classified in one of the states 202, 203.

This illustrates that it is a-priori unknown whether or not the power exchange 121 is actually requested. At the time 289 at which the optimization is performed (i.e. shortly before the beginning of the planning interval 290), there are no actual requests for activation of the power exchange 121. However, it could be that an applicable request is received at a time within the planning interval 290, so that reclassification of individual time intervals 293-298 is performed in the short term.

In order to be able to react to a—in comparison with the length of the planning interval 290—short-term request of this kind for activating the power exchange 121, a reserve concept is implemented. In particular, this is achieved by virtue of the constraint of the discrete-time optimization in the time intervals 293-298 with state 201 providing for the buildup and holding of a power reserve. Appropriate techniques are described with reference to FIG. 5.

FIG. 5 illustrates aspects with reference to the constraint 250 of the discrete-time optimization. In particular, FIG. 5 correlates with FIG. 4. FIG. 5 illustrates the choice of the constraint 250, so that a power reserve 251 is defined in the time intervals 293-298 with the state 201 (cf. FIG. 3).

FIG. 5 illustrates in particular the size of the power reserve 251 as a function of time or as a function of time intervals 291-299. From FIG. 5, it is clear that the constraint 250 of the discrete-time optimization is chosen such that the power reserve 251 assumes a larger value during the time intervals 293-298 with the state 201 than the power reserve 251 in the time intervals 291, 292, 299 with the state 200.

In this case, the power reserve 251 can be either positively defined or else negatively defined in the example of FIG. 5. This means that the operational planning of the microgrid 100 can involve energy sources and/or energy consumers being actuated to provide a positive power reserve or a negative power reserve.

FIG. 6 illustrates aspects with reference to the discrete-time optimization. In particular, FIG. 6 illustrates aspects with reference to the states 200-203. FIG. 6 is in particular associated with FIGS. 4 and 5. FIG. 6 corresponds to the fresh performance of the discrete-time optimization in reaction to the receiving of a control signal 310, for example from a control node of the primary grid 120. The optimization is performed afresh at the later time 288.

The control signal 310 is indicative of the requested power exchange 121. This means that the power exchange 121 is actually supposed to be activated. This requires adaptation of the operational planning of the microgrid 100, which is why fresh performance of the optimization is triggered on the basis of the control signals 310.

With reference to the performance of the optimization at the time 288, the time intervals 294, 295 are in particular reclassified from the state 201 (cf. FIG. 4) into the state 202. The state 202 corresponds to (ii) power exchange requested, as already described above. Additionally, in the example of FIG. 6, the time intervals 296, 297 are also reclassified from the state 201 (cf. FIG. 4) into the state 203. The state 203 corresponds to (iii) active power exchange, i.e. in this case there is an actual exchange of energy between the microgrid 100 and the primary grid 120. The reclassified time intervals 294-297 are highlighted in FIG. 6 by means of the shadowing.

This reclassification can mean that the target function and/or the constraint of the optimization for the applicable time intervals 294-297 is changed. This is depicted with reference to FIG. 7, for example. FIG. 7 illustrates aspects with reference to the constraint 250 of the discrete-time optimization. In particular, FIG. 7 illustrates a power reserve 251 that is kept in the one or more nodes 101-106 of the microgrid 100. In this case, FIG. 7 correlates with FIG. 6. In particular, in the example of FIG. 7, it can be seen that the constraint 250 implements a further increase in the power reserves 251 during the time intervals 294, 295 with state 202 (to this end, a length of time 240 for the state 202 may have been accordingly prescribed), so that the power exchange 121 can subsequently reduce these power reserves 251 in the time intervals 296, 297 with state 203. This means that the constraint 250 allows the reduction of the power reserve 251 for performance of the power exchange 121 in the time intervals 296, 297. From a comparison of FIG. 5 with FIG. 7, it can be seen that the constraint 250 is dependent on the state 201-203 of the time intervals 294-297.

Taking into consideration the length of time 240 allows adequate preparation for the activation of the power exchange 121 to be achieved, i.e. e.g. a sufficiently large power reserve is built up.

From FIGS. 6 and 7, it can thus be seen that the time intervals 294-295 with state 202 follow the time intervals 292-293 with state 201; and the time intervals 296-297 with state 203 in turn follow the time intervals 294-295 with state 202. This means that gradual preparation for the activation of the power exchange 121 in the time intervals 296-297 with the state 203 can take place, in particular even if the actual time of activation of the power exchange 121 is not yet known a priori, i.e. when the optimization is first performed at the time 289.

As already mentioned above, it would be possible for further or other states to be taken into consideration in addition or as an alternative to the states 200-203 (cf. FIG. 4 and FIG. 6), for example. An appropriate example is depicted in FIG. 8.

FIG. 8 illustrates aspects with reference to the discrete-time optimization. In particular, FIG. 8 illustrates various states 200-204 into which the different time intervals 291-299 may have been classified. In this case, the example of FIG. 8 fundamentally corresponds to the example of FIG. 6. However, the example of FIG. 8 contains a further state 204, the state 204 being able to be referred to as (iv) regeneration. In the case of regeneration, the constraint 250 can be chosen such that the power reserve 251 is restored in the applicable time interval 298 before the power exchange 121 is activated again (fresh activation of the power exchange 121 is not depicted in FIG. 8). Again, it would be possible for an applicable length of time 241 of the time intervals 298 provided for restoring the power reserve 251 following the time intervals 296-297 with state 203 to be prescribed, for example on the basis of agreements between the operators of the microgrid 100 and the primary grid 120.

Provision of the state 204 (iv) regeneration allows an excessive reduction of the power reserve 251 to be avoided. A further strategy to avoid an excessive reduction of the power reserve 251 can also be achieved by taking into consideration a positive and/or negative tolerance 260 with reference to the power exchange 121 (cf. FIG. 7, where the applicable tolerances in the time intervals 296, 297 with reference to the reduction of the power reserve 251 are illustrated). These tolerances 260 can relate to a prescribed value for the power exchange 121, for example.

The concept according to which taking into consideration various states 200-204 allows the power exchange 121 between the microgrid 100 and the primary grid 120 to be taken into consideration has thus been described above. The target function and/or the constraint of the optimization can be adapted accordingly. An exemplary actual implementation of such adaptation of the constraint of the optimization is described below, the optimization being performed as integer linear optimization. However, this should be understood to mean that it is fundamentally possible to use other techniques too with reference to the optimization, in which case it is also possible for an applicable adaptation of the constraint to the other techniques of the optimization to be taken into consideration.

In the example described below, a linear inequality is first of all described in order to model the power exchange 121. It is then shown that this inequality can be integrated into applicable operational planning of a microgrid 100, there being a particular possibility of taking into consideration that it is a priori unknown at what actual time control signals 310 actually request the power exchange 121. The text below sets out what inequalities can be used in an integer nonlinear optimization model to control a microgrid 100 with a connection 110 to a primary grid 120.

In this case, the following parameters are taken into consideration for each time interval 291-299 $t_n$:

Mode($t_n$): generated from the input data and determines the state 200-204 that the microgrid 100 is in for the power exchange 121 in the time interval $t_n$, i.e.

Mode $(t_n) \in \{$AVAILABLE, UTILIZED, RESPONSE, RECOVERY, OFF$\}$,

Here, AVAILABLE denotes the state 201, UTILIZED denotes the state 203, RESPONSE denotes the state 202, RECOVERY denotes the state 204 and OFF denotes the state 200.

R($t_n$): actually requested power for the power exchange 121 in a time interval $t_n$. Positive if power delivery to the primary grid is requested (Bus2Grid) or negative for power acceptance from the primary grid (Grid2Bus).

Max$^{Bus2Grid}$($t_n$), Max$^{Grid2Bus}$($t_n$): maximum capacity of the primary grid connection 110

Dev$^{Up}$, Dev$^{Down}$: limits for the permitted deviation from R($t_n$), i.e. tolerance 260 (cf. FIG. 7)

Variables for each time interval $t_n$:

$p^{Bus2Grid}(t_n)$ and $p^{Grid2Bus}(t_n)$ (constant): power delivery/acceptance on the primary grid Grid2Bus ($t_n$) (binary): indicator variable (1 for power acceptance, 0 for power delivery)

Constraints for each time interval $t_n$:

$$p^{Bus2Grid}(t_n) \leq (1-\text{Grid2Bus}(t_n))*R(t_n)*(1+\text{Dev}^{Up}) \quad (1)$$

(Upper limit for power delivery)

$$p^{Bus2Grid}(t_n) \geq (1-\text{Grid2Bus}(t_n))^*R(t_n)^*(1+\text{Dev}^{Down}) \quad (2)$$

(Lower limit for power delivery)

$$p^{Bus2Grid}(t_n) \leq \text{Max}^{Bus2Grid}(t_n) \quad (3)$$

(Upper limit for power delivery)

$$p^{Grid2Bus}(t_n) \leq \text{Grid2Bus}(t_n))^*(-R(t_n))^*(1+\text{Dev}^{Up}) \quad (4)$$

(Upper limit for power acceptance)

$$p^{Grid2Bus}(t_n) \geq \text{Grid2Bus}(t_n))^*(-R(t_n))^*(1+\text{Dev}^{Down}) \quad (5)$$

(Lower limit for power acceptance)

$$p^{Grid2Bus}(t_n) \leq \text{Max}^{Bus2Grid}(t_n) \quad (6)$$

(Upper limit for power acceptance)
If $(R(t_n)<0)$ $$\text{Grid2Bus}(t_n)=1 \quad (7.1)$$

Otherwise $$\text{Grid2Bus}(t_n)=0 \quad (7.2)$$

For example, it would be possible for applicable turnovers or operating parameters that can be achieved by using the power exchange 121 to be taken into consideration in the target function of the optimization. In this case, the target function can for example distinguish whether there is actual activation of the power exchange 121 by an appropriate control signal 310 or time intervals 296, 297 with state 203, or else the fundamental possibility of the power exchange 121 in a standby state 201. Besides such terms in the target function as relate to the power exchange 121, it would also be possible to take into consideration further or other variables.

The inequalities (1)-(7) of the constraints of the optimization in the state 203 can thus model the control of the microgrid 100 for actual activation of the power exchange 121. These constraints can be integrated into other optimizations, for example into techniques as described in "*Optimal Operational Planning for PV-Wind-Diesel-Battery Microgrid*, G. G. Moshi, C. Bovo, and A. Berizzi, IEEE Eindhoven PowerTech, 2015".

From the above, it can in turn be seen that during the operative control of the microgrid 100 it is not known a priori precisely when delivery of the power exchange 121 is required by means of the control signal 310; rather, it may merely be known (for example at the time 289, cf. FIG. 4) in which potential time window (defined by the time intervals 293-298 in the state 201) and to what extent (possibly taking into consideration the tolerance 260) a potential involvement in the power exchange 121 has been contractually agreed. Not until the operator of the primary grid 120 sends the control signal 310 to request activation of the power exchange 121 is the planning device of the microgrid 100 able to gain final certainty that powers for the power exchange 121 need to be made available or drawn (cf. FIG. 6, where the control signal 310 is received with reference to the fresh performance of the optimization at the time 288). In typical agreements pertaining to the control power reserve, it is then possible to specify how quickly the microgrid 100 needs to be ready for activation of the power exchange 121, i.e. how quickly a participant needs to be ready to actually deliver or draw power to or from the primary grid 120 after the control signal 310 is received. An applicable prescribed length of time 240 (cf. FIG. 6) can be taken into consideration for the constraint as a prescribed length of time for the time intervals 294, 295 in the state 202.

For integration into the prospective operational planning of the microgrid 100, it is therefore often desirable to initially take into consideration only the information about the time windows for the potential involvement, i.e. as described with reference to FIG. 4, for example, to classify the time intervals 293-298 into the standby state 201. The information about the actual activation of the power exchange 121 can then be made available on the basis of reception of the control signal 310, and a fresh optimization can be triggered taking into consideration the requested power for the power exchange 121 at the connection 110 of the primary grid 120 (cf. FIG. 6, optimization at the time 288). That is to say that a new optimization can be performed on the basis of reception of the control signal 310, with specific time intervals 294-297 being able to be reclassified from state 200 into the state 202 and 203 or else into the state 204 (cf. FIG. 6).

As described above, a reserve concept can be implemented. The reserve concept can be used to cause the microgrid 100 to build up a power reserve 251 in time intervals 293-298 with standby state 201 (i.e. fundamental provision of the power exchange 121) (cf. FIG. 5). This allows preparation for the actual activation of the power exchange 121 to be achieved. Such a power reserve 251 for the time intervals 293-298 in the state 201 can be integrated in particular into existing power reserve concepts of conventional optimizations. In this case, components providing energy, such as for example a battery or a running diesel generator, can make a positive contribution to the power reserve 251, whereas power delivered to consumers, for example, can require a certain level of negative power reserve 251. With reference to the power reserve 251, it is also possible for a certain amount of energy for the power exchange 121 to be taken into consideration. In this way, it is possible to ensure that the microgrid 100 can react if the power exchange is actually activated by means of the control signal 310. In this case, the optimization does not require clarification of whether a battery is charged or a generator is started. Depending on the target function, different strategies can be obtained as the result of the optimization, and the operational planning can be performed accordingly. The constraint used in the optimization can have the following form in exemplary fashion, for example, where $OR^{req}(K)$, and $OR^{del}(K)$, describe the required power reserve, or the power reserve made available, of a node 101-106 K. The way in which this is configured differs depending on the type of component:

$$\sum_{\text{Nodes } K \text{ providing } OR} OR^{del}(K, t_n) - \sum_{\text{Nodes } K \text{ needing } OR} OR^{req}(K, t_n) \geq 0$$

In order to model the power reserve 152, $OR^{req}$ and $OR^{del}$ can b e adapted for the primary grid connection 110. This takes place on the basis of the state Mode $(t_n)$ $\in\{\text{AVAILABLE, UTILIZED, RESPONSE}\}$. If $OR^{req}(\text{grid}, t_n)>0$, accordingly $OR^{del}(\text{grid}, t_n)=0$; the primary grid 120 thus cannot be used in these time intervals to compensate for other fluctuations. Similarly, an inequality as constraints of the optimization that are associated with the power reserve 251 can be set up that ensures that there is enough draw capacity for the power draw from the primary grid connection.

In summary, techniques have been described above to perform operational planning for a microgrid by means of an optimization. In this case, the optimization can resort to a target function and/or one or more constraints that are adapted on the basis of a state into which one or more respective time intervals of the discrete-time optimization have been classified. A reserve concept has been described that involves the constraint being established in particular for time intervals classified into a state that corresponds to a standby before the actual requesting of the power exchange. This power reserve can then be reduced in time intervals in which the power exchange has actually been activated.

Such techniques have specific advantages, in particular in comparison with the reference implementations—for example in accordance with "*A MILP model for optimising multi-service portfolios of distributed energy storage*, R. Moreno, R. Moreira, G. Strbac, Applied Energy 137, pages 554-566, 2015":

Simplicity: the approach described here allows the delivery/drawing of control power to be easily integrated into existing and future optimization-based programs, in particular into programs using a linear integer optimization. One possible example would be "*Optimal Operational Planning for PV-Wind-Diesel-Battery Microgrid*, G. G. Moshi, C. Bovo, and A. Berizzi, IEEE Eindhoven PowerTech, 2015", for example. Rolling optimized control of microgrids can be achieved thereby. Adaptation to different architectures and types of microgrids is possible.

Efficiency increase: readiness to deliver or draw control power to or from the primary grid connection allows the operators of microgrids to increase efficiency during operation of the microgrid. The primary grid can be stabilized. Power peaks can be absorbed. Cooperation between the operational planning of the primary grid and of the microgrid is possible.

Flexibility: the techniques described herein can be used to implement different types of control power with different basic conditions. For example, a short-term power reserve or else a long-term power reserve could be implemented by means of the techniques described.

The techniques described herein add to programs for operational planning of microgrids that are based on integer linear optimizations, in particular. The techniques described herein are well suited to complex but runtime-critical applications with planning optimization at runtime.

The integration of the power exchange in this case by taking into consideration the extension of conventional constraints and/or target functions may be possible in particularly simple fashion and without increased complexity.

Flexibility: the techniques described herein can be used to model different approaches to power exchange with one and the same constraints and/or target function. This is ensured by general parameterization, as described above. In particular, this is achieved by taking into consideration different states on the basis of which the target function and/or one or more constraints can be adapted. This allows in particular the concept of a power reserve to be modeled. Additionally, taking into consideration the states provides the option of using specific tolerances and in this way permitting deviations in the provision of the power exchange.

Integration into an existing power reserve concept may be possible, i.e. it would be possible for the constraint to take into consideration the power exchange as positive power reserves for a node of the microgrid that describes the connection of the microgrid to the primary grid. Additionally, differentiated provision of information to a controller can take place on the basis of the respective state.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for predictive operational planning in a microgrid with a connection to a primary grid, wherein the microgrid includes a plurality of nodes, wherein the method comprises:
   performing a discrete-time optimization of a target function for a planning interval comprising multiple time intervals by taking into consideration a constraint, wherein the target function and/or the constraint is determined on the basis of multiple system states of the microgrid according to which the time intervals are classified, wherein the system states are selected from the following group: (i) standby for power exchange, (ii) power exchange requested and (iii) active power exchange, and
   performing the operational planning on the basis of a result of the optimization, wherein the operational planning includes a power exchange between the microgrid and the primary grid via the connection, and wherein performing the operational planning includes controlling one or more nodes of the plurality of nodes and configuring an architecture of the microgrid,
   receiving a control signal indicative of a requested power exchange, and
   triggering performance of the optimization on the basis of the control signal.

2. The method as claimed in claim 1,
   wherein the constraint in time intervals with system state (i) standby for power exchange defines a buildup of a power reserve for one or more nodes of the plurality of nodes of the microgrid.

3. The method as claimed in claim 2,
   wherein the constraint in time intervals with system state (iii) active power exchange allows a reduction of the power reserve for performing the power exchange.

4. The method as claimed in claim 1,
   wherein time intervals with system state (ii) power exchange requested follow time intervals with state (i) standby for power exchange,
   wherein time intervals with system state (iii) active power exchange follow time intervals with state (ii) power exchange requested.

5. The method as claimed in claim 1,
   wherein the group from which the system states are selected furthermore comprises: (iv) regeneration,
   wherein time intervals with system state (iv) regeneration follow time intervals with system state (iii) active power exchange,
   wherein the constraint in time intervals with system state (iv) regeneration defines a restoration of a power reserve that was reduced in time intervals with system state (iii) active power exchange.

6. The method as claimed in claim 1, further comprising:
   prior to performance of the optimization and on the basis of the control signal:
   reclassifying time intervals with system state (i) standby for power exchange into time intervals with system state (ii) power exchange requested.

7. The method as claimed in claim 1,
wherein the constraint in time intervals with system state (iii) active power exchange takes into consideration a prescribed value for the power exchange.

8. The method as claimed in claim 7,
wherein the constraint in time intervals with system state (iii) active power exchange takes into consideration a positive tolerance and/or negative tolerance for the prescribed value.

9. The method as claimed in claim 1,
wherein the constraint takes into consideration the power exchange as a positive power reserve for a node of the plurality of nodes of the microgrid that describes the connection in time intervals with system state (iii) active power exchange.

10. The method as claimed in claim 1,
wherein the constraint takes into consideration a prescribed length of time for the time intervals with system state (ii) power exchange requested.

11. The method as claimed in claim 1,
wherein the optimization is performed as integer linear optimization.

12. A device configured for predictive operational planning in a microgrid with a connection to a primary grid, wherein the microgrid includes a plurality of nodes, wherein the device is configured to carry out the following steps:

performing a discrete-time optimization of a target function for a planning interval comprising multiple time intervals and by taking into consideration a constraint, wherein the target function and/or the constraint is determined on the basis of multiple system states of the microgrid according to which the time intervals are classified, wherein the system states are selected from the following group: (i) standby for power exchange, (ii) power exchange requested and (iii) active power exchange, and performing the operational planning on the basis of a result of the optimization, wherein the operational planning includes a power exchange between the microgrid and the primary grid via the connection, and wherein performing the operational planning includes controlling one or more nodes of the plurality of nodes and configuring an architecture of the microgrid, receiving a control signal indicative of a requested power exchange, and triggering performance of the optimization on the basis of the control signal.

13. The device as claimed in claim 12,
wherein the device is configured to perform the method as claimed in claim 1.

* * * * *